United States Patent
Li et al.

(10) Patent No.: US 12,299,014 B1
(45) Date of Patent: May 13, 2025

(54) SYSTEMS AND METHODS FOR AUTOMATICALLY BUILDING DYNAMIC QUERIES FOR IDENTIFYING DATA IN UNSTRUCTURED DATASETS

(71) Applicant: BANK OF AMERICA CORPORATION, Charlotte, NC (US)

(72) Inventors: Yvonne Li, Jersey City, NJ (US); Yipeng Zhu, Jersey City, NJ (US); Zhexiao Zhang, Jersey City, NJ (US); Nizar Naitlho, Jersey City, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/678,409

(22) Filed: May 30, 2024

(51) Int. Cl.
G06F 16/00 (2019.01)
G06F 16/332 (2019.01)

(52) U.S. Cl.
CPC .................. *G06F 16/332* (2019.01)

(58) Field of Classification Search
CPC .................................................. G06F 16/332
See application file for complete search history.

(56) References Cited

U.S. PATENT DOCUMENTS

2016/0371368 A1* 12/2016 Brown ................ G06F 16/2456

* cited by examiner

*Primary Examiner* — Ajith Jacob
(74) *Attorney, Agent, or Firm* — Moore & Van Allen PLLC; Lauren M. Stokes

(57) ABSTRACT

Systems, computer program products, and methods are described herein for automatically building dynamic queries for identifying data in unstructured datasets. The present disclosure is configured to receive a plurality of pre-defined query templates associated with an alert type(s); dynamically filter the plurality of pre-defined query templates based on the alert type(s); identify an unstructured database note(s) based on a user identifier; apply the unstructured database note(s) and the filtered plurality of pre-defined query templates to an unstructured notes search engine; generate, by the unstructured notes search engine, at least one raw score for the at least one unstructured database note and for each alert type(s); transform, by the unstructured notes search engine, the at least one raw score to a relevancy score using a quantile transformation; and determine a highest relevancy score for each of the at least one unstructured database note for the user identifier.

20 Claims, 8 Drawing Sheets

SYSTEMS AND METHODS FOR AUTOMATICALLY BUILDING DYNAMIC QUERIES FOR IDENTIFYING DATA IN UNSTRUCTURED DATASETS

TECHNOLOGICAL FIELD

Example embodiments of the present disclosure relate to automatically building dynamic queries for identifying data in unstructured datasets.

BACKGROUND

Issues often arise in electronic database management of filtering unstructured database files, determining information within the unstructured database files, and pushing the correct unstructured database files to the correct device automatically and efficiently. Such issues are further exacerbated by the breadth and scope of databases today, which may have to track and record all electronic communications between devices and other computer-generated files without any identifying information what each file contains. Thus, tracking and accessing particular files can be extremely difficult, computer resource consuming, and time consuming. Thus, an invention that can accurately, efficiently, dynamically, and automatically build queries for these unstructured database files, determine the relevancy of each unstructured database files based on these queries, and identify the most relevant unstructured database files is needed.

Applicant has identified a number of deficiencies and problems associated with querying unstructured datasets dynamically, automatically, and efficiently. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for automatically building dynamic queries for identifying data in unstructured datasets.

In one aspect, a system for automatically building dynamic queries for identifying data in unstructured datasets is provided. In some embodiments, the system may comprise: a processing device; a non-transitory storage device containing instructions when executed by the processing device, causes the processing device to perform the steps of: receive a plurality of pre-defined query templates associated with at least one alert type; dynamically filter the plurality of pre-defined query templates based on the at least one alert type; identify at least one unstructured database note based on a user identifier; apply the at least one unstructured database note and the filtered plurality of pre-defined query templates to an unstructured notes search engine; generate, by the unstructured notes search engine, at least one raw score for the at least one unstructured database note and for each of the at least one alert type; transform, by the unstructured notes search engine, the at least one raw score to a relevancy score using a quantile transformation; and determine a highest relevancy score for each of the at least one unstructured database note for the user identifier.

In some embodiments, the system may further comprise non-transitory storage device containing instructions when executed by the processing device, causes the processing device to perform the steps of determining a relevancy score threshold; and comparing the relevancy score threshold to the highest relevancy score for the user identifier.

In some embodiments, the system may further comprise non-transitory storage device containing instructions when executed by the processing device, causes the processing device to perform the steps of: determining whether to close the at least one alert type associated with the user identifier based on the relevancy score threshold compared with the highest relevancy score, closing, in an instance where the highest relevancy score meets or exceeds the relevancy score threshold, the at least one alert type associated with the user identifier, or advancing, in an instance where the highest relevancy score does not meet the relevancy score threshold, the user identifier to an alert evaluation module.

In some embodiments, the at least one unstructured database note is associated with a creation timestamp. In some embodiments, the creation timestamp is compared to a timestamp threshold, and filter, in an instance where the creation timestamp meets or exceeds the timestamp threshold, out the at least one unstructured database note.

In some embodiments, the at least one unstructured database note is received from a database comprising a plurality of unstructured note datasets each comprising a plurality of unstructured database notes for each user identifier.

In some embodiments, the at least one alert type comprises user characteristic data, user account data, historical occurrence data, or historical alert evaluation module contact data.

In some embodiments, the dynamic filtering of the at least one pre-defined query templates comprise automatically deleting non-applicable pre-defined query templates based on the at least one alert type.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
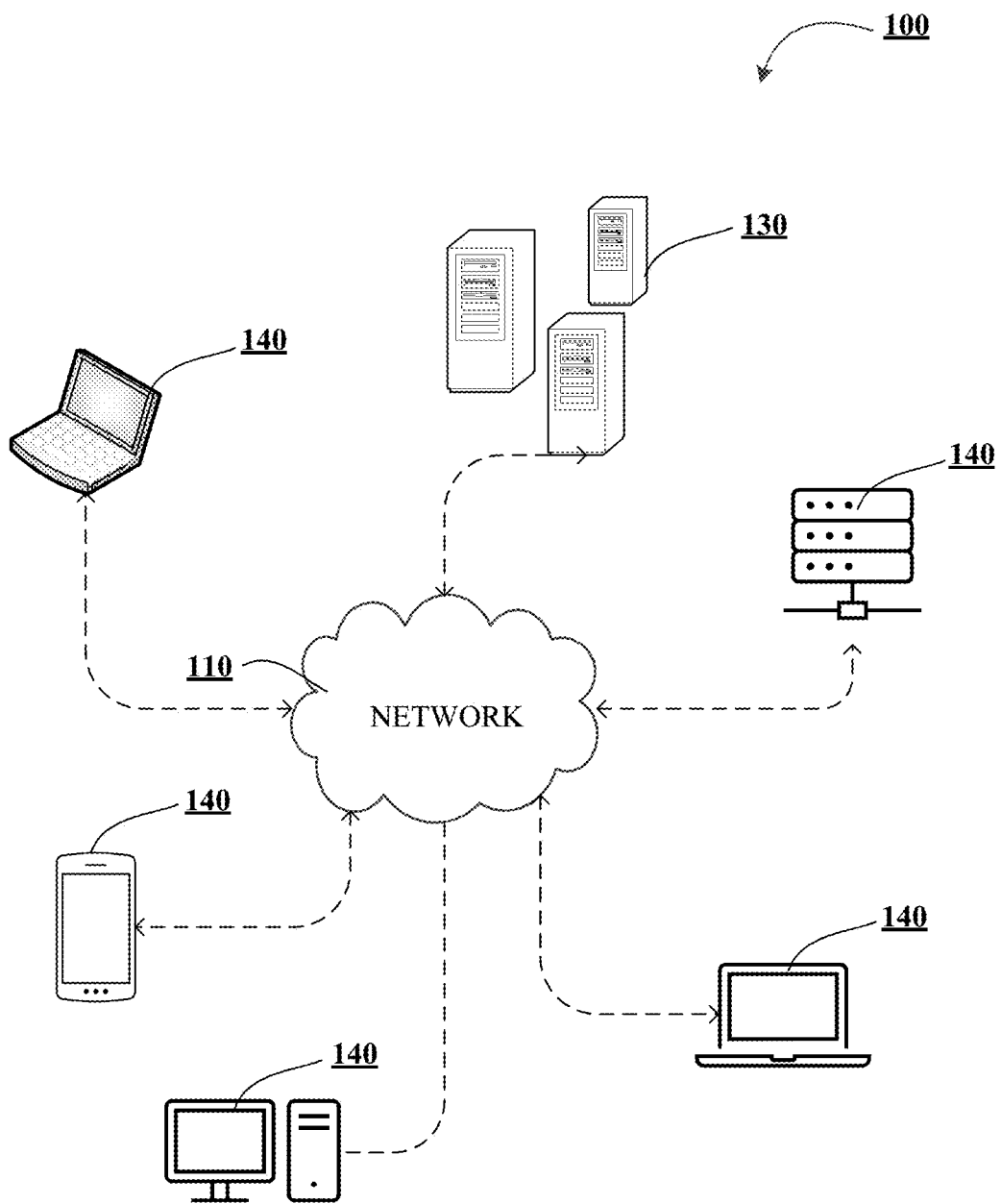
Figure 1B:
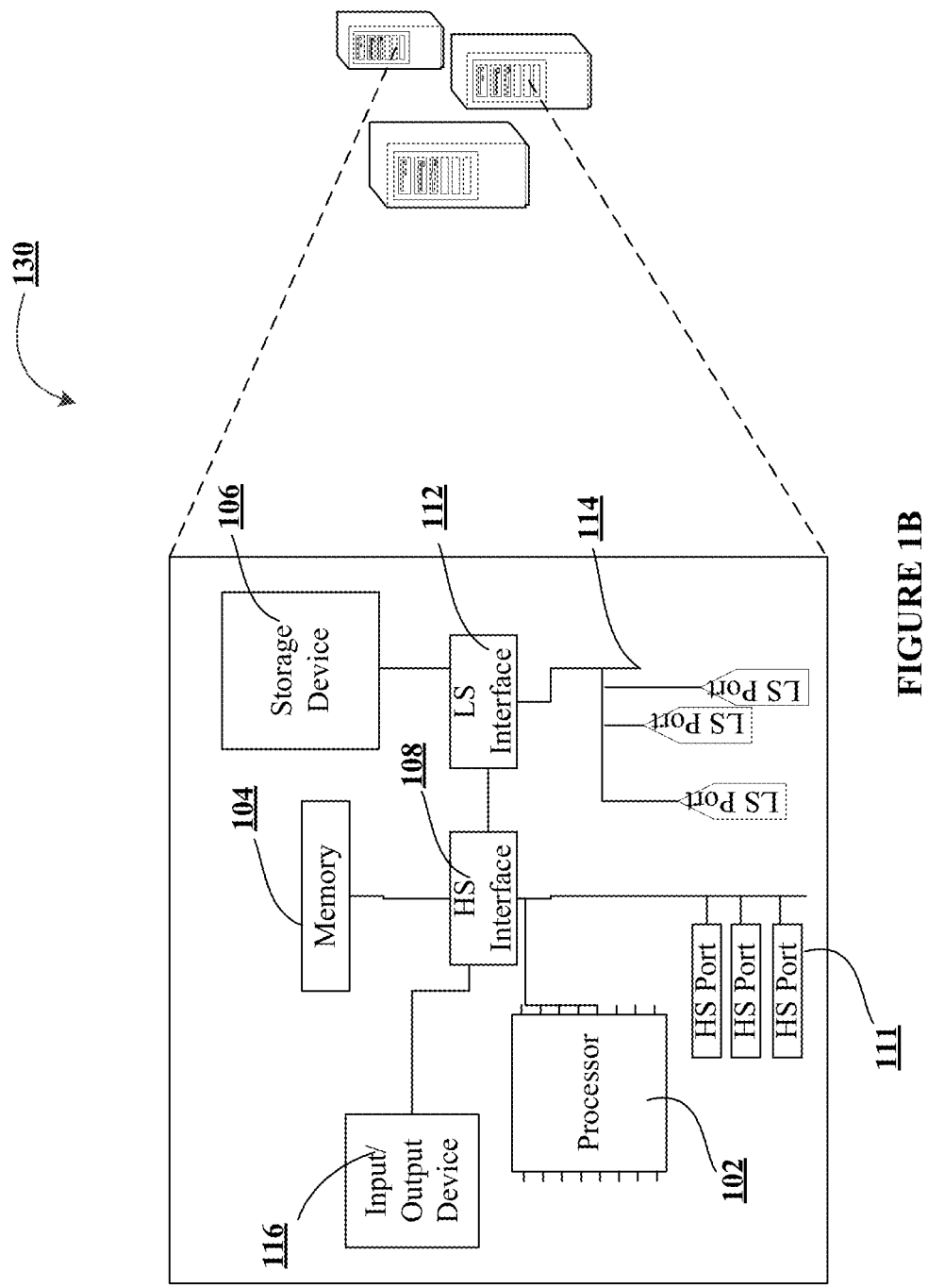
Figure 1C:
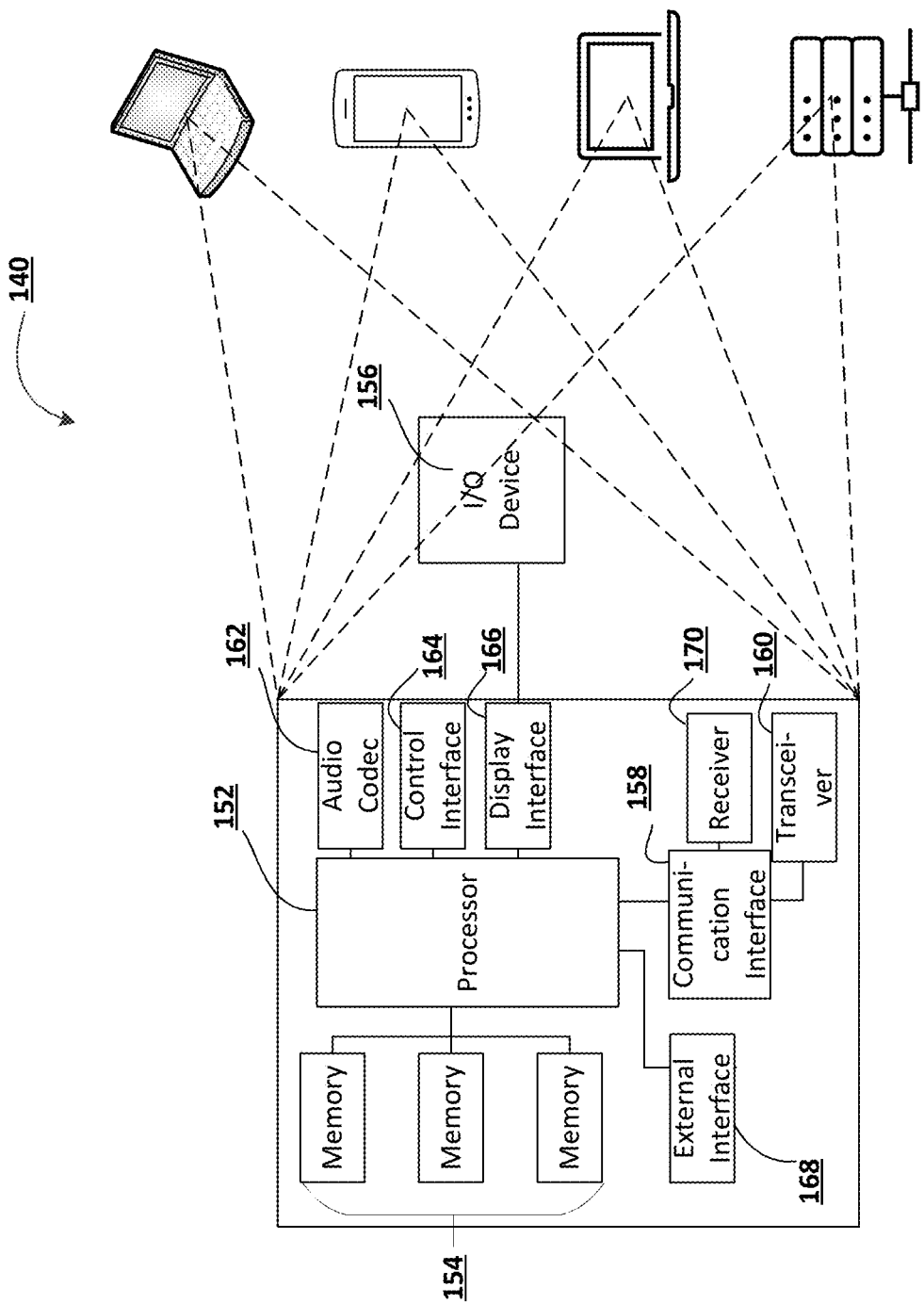
Figure 2:
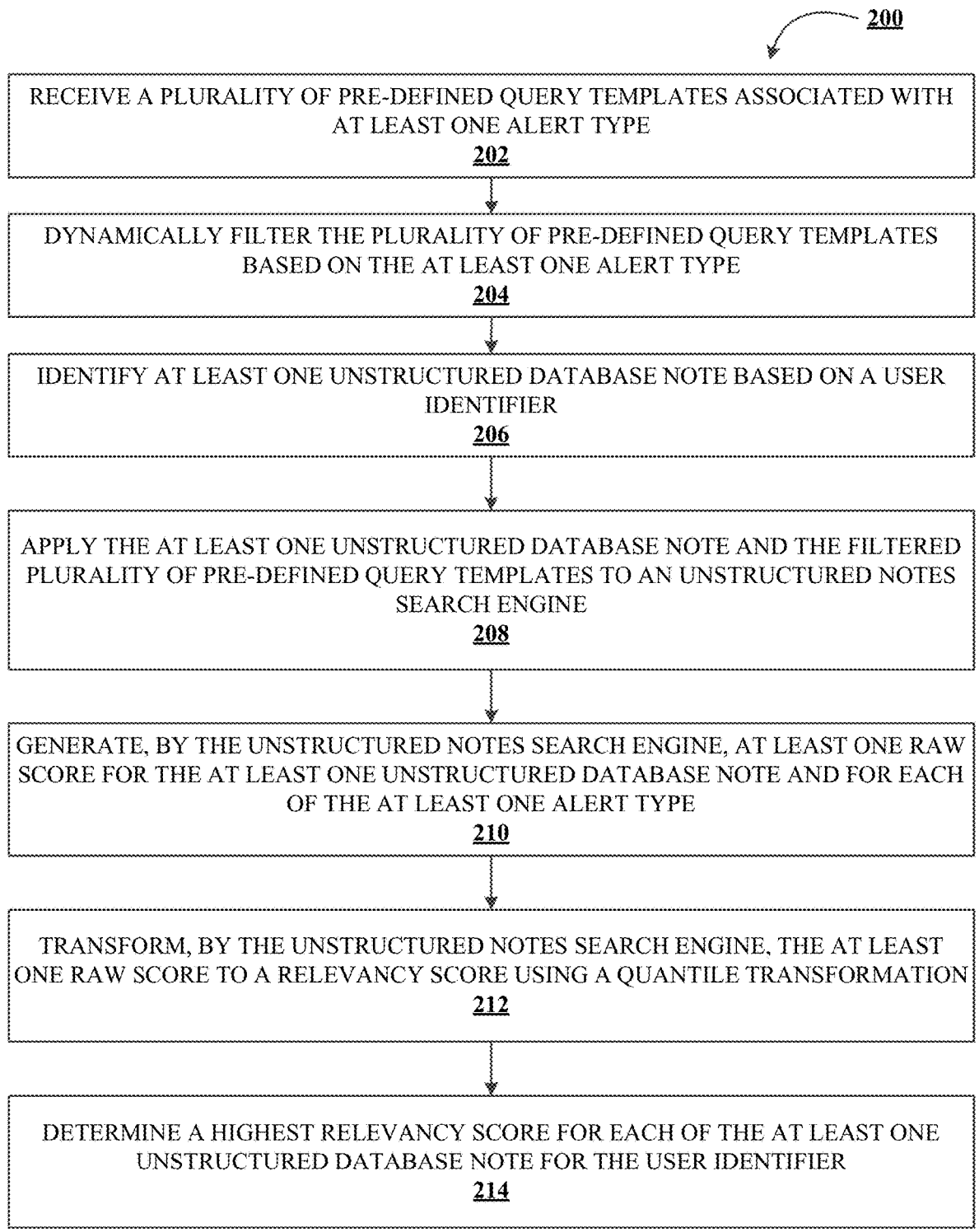
Figure 3:
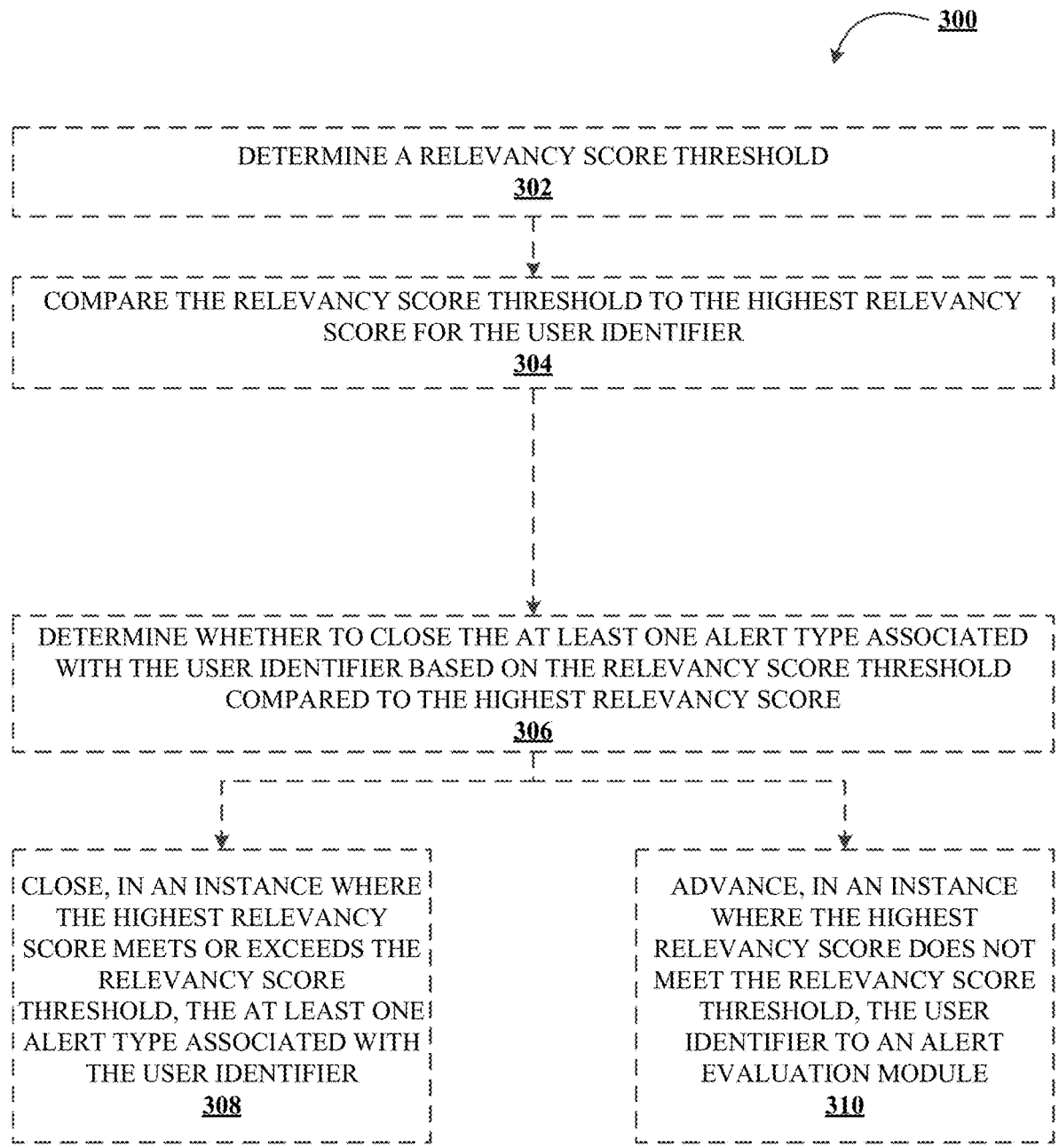
Figure 4:
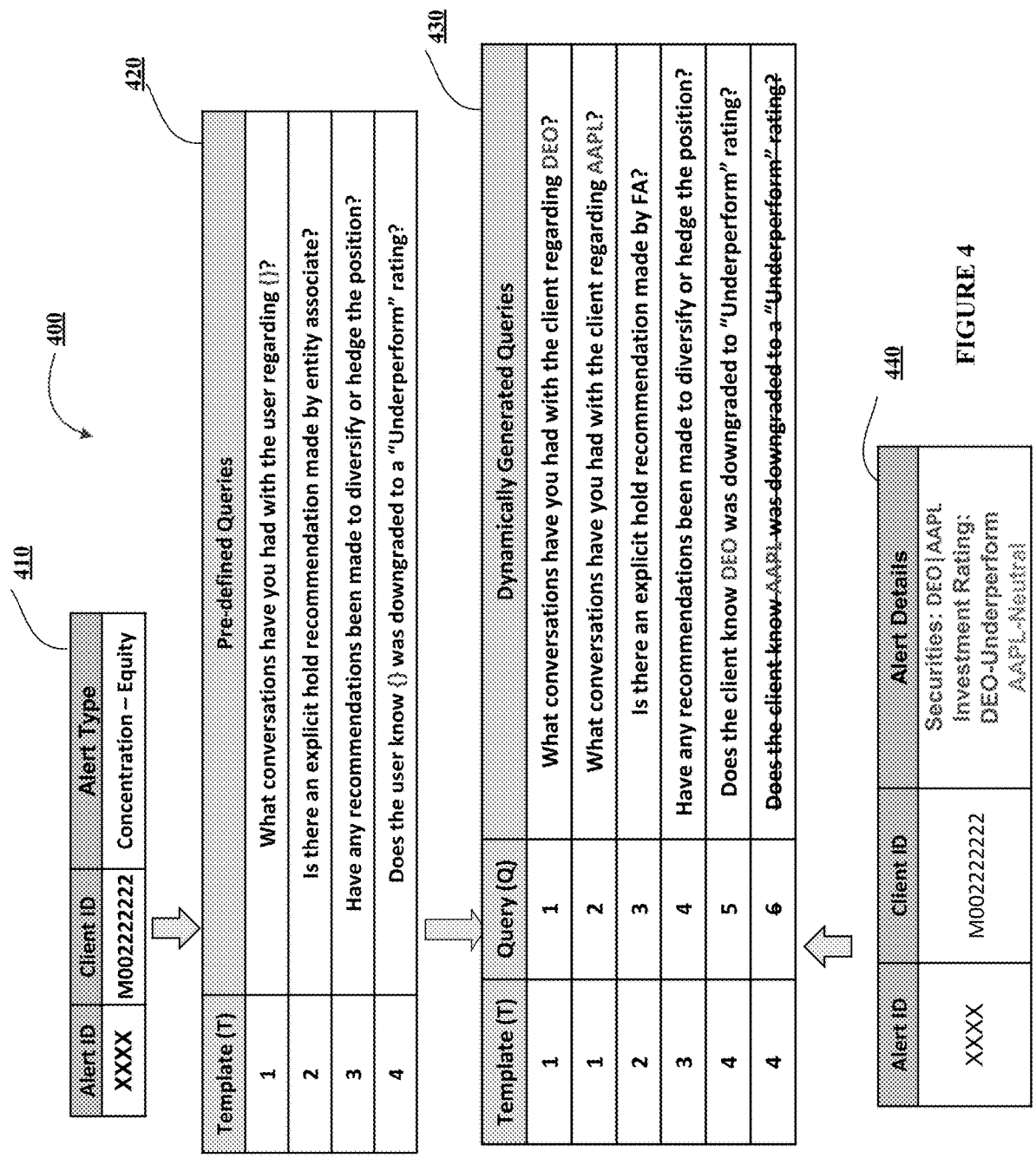
Figure 5:
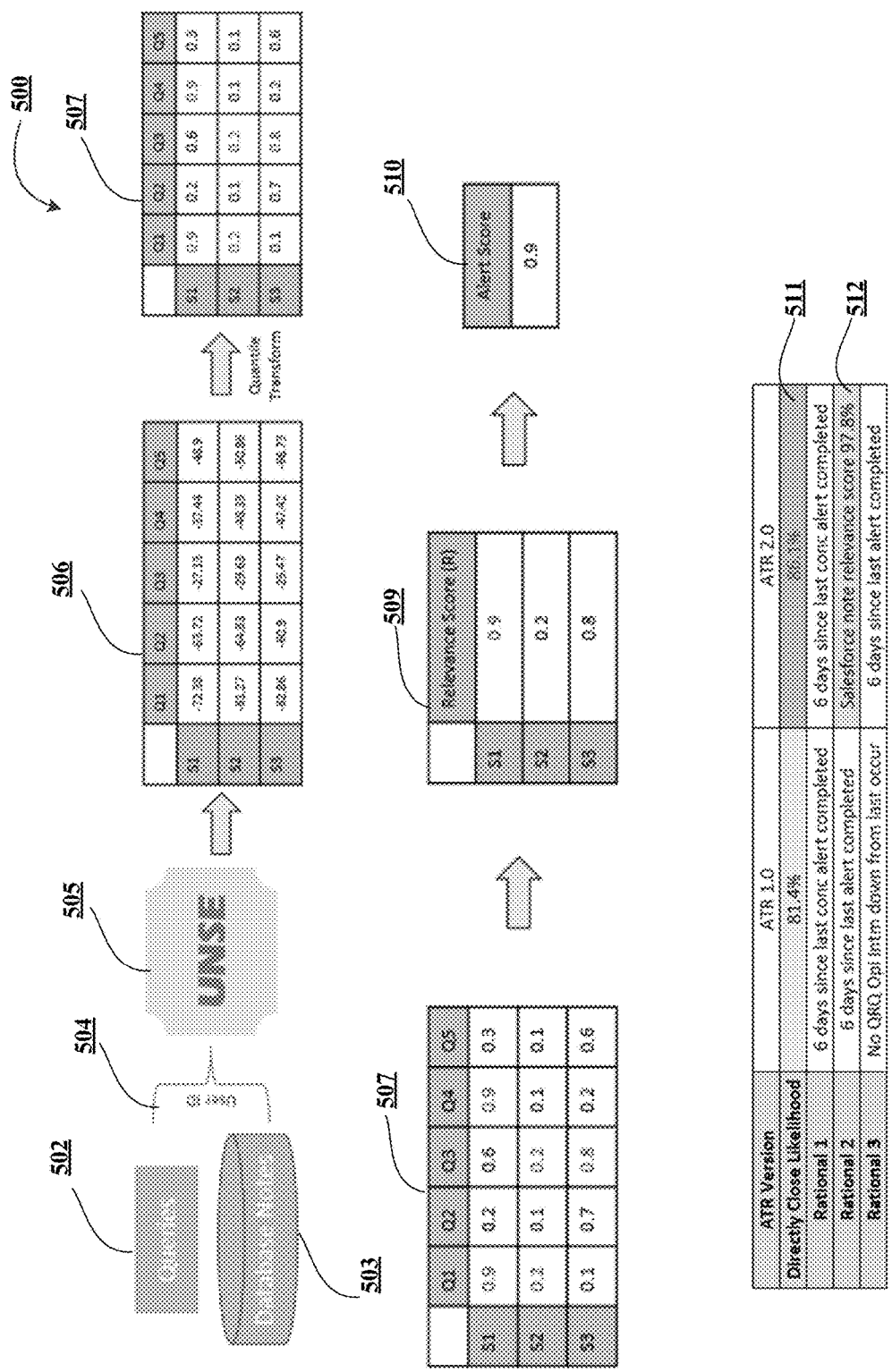
Figure 6:
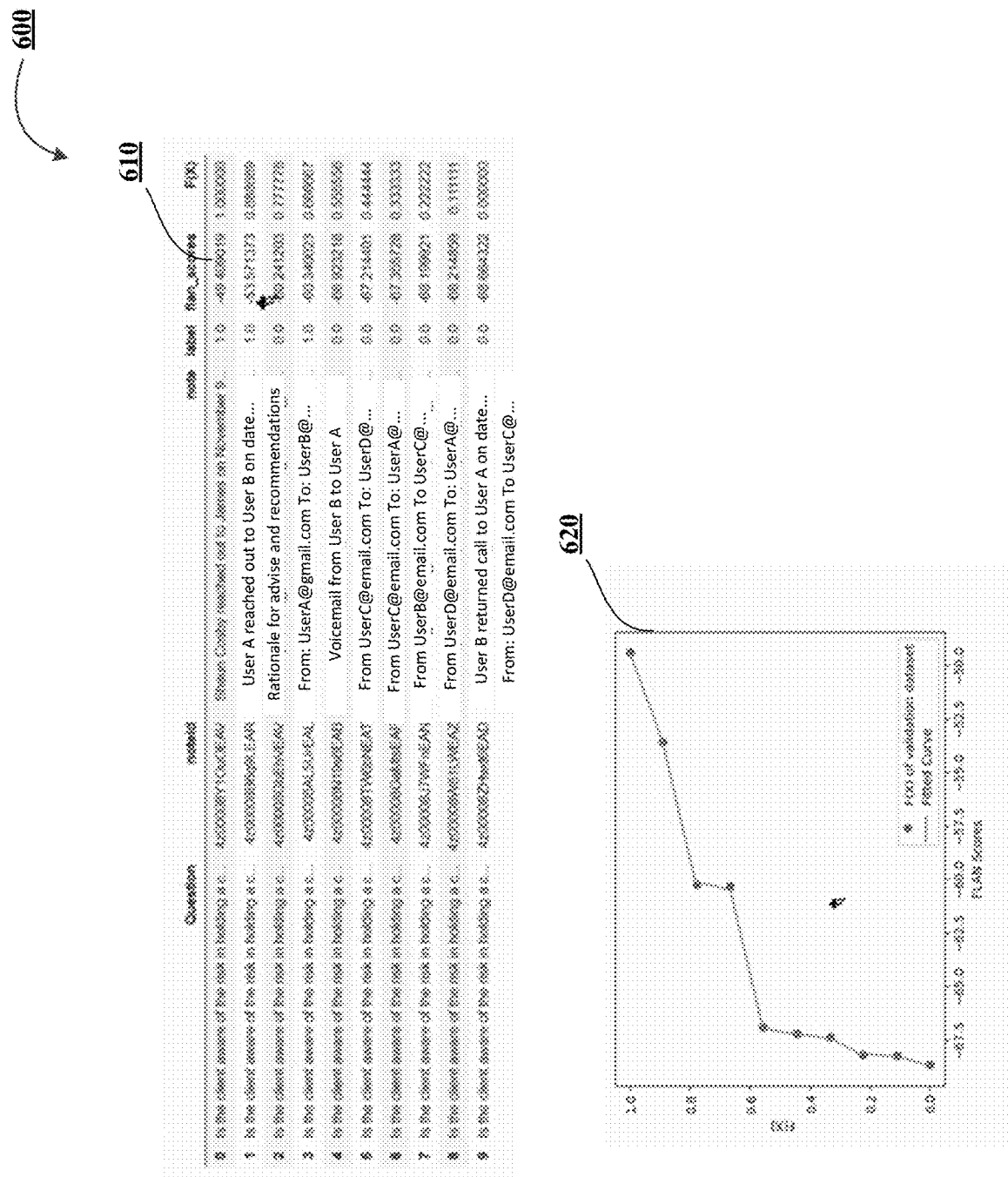

FIGS. 1A-1C illustrates technical components of an exemplary distributed computing environment for automatically building dynamic queries for identifying data in unstructured datasets, in accordance with an embodiment of the disclosure;

FIG. 2 illustrates a process flow for automatically building dynamic queries for identifying data in unstructured datasets, in accordance with an embodiment of the disclosure;

FIG. 3 illustrates a process flow for closing or advancing a user identifier associated with a relevancy score based on a comparison of the highest relevancy score to a relevancy score threshold, in accordance with an embodiment of the disclosure;

FIG. 4 illustrates table diagrams for generating and filtering pre-defined query templates, in accordance with an embodiment of the disclosure;

FIG. 5 illustrates table diagrams for generating relevancy scores for the pre-defined query templates, determining a highest relevancy score, and determining a relevancy score threshold, in accordance with an embodiment of the disclosure; and FIG. 6 illustrates table and graph diagrams for a quantile transformation, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Issues often arise in electronic database management of filtering unstructured database files, determining information within the unstructured database files, and pushing the correct unstructured database files to the correct device automatically and efficiently. Such issues are further exacerbated by the breadth and scope of databases today, which may have to track and record all electronic communications between devices and other computer-generated files without any identifying information what each file contains. Thus, tracking and accessing particular files can be extremely difficult, computer resource consuming, and time consuming. Thus, an invention that can accurately, efficiently, dynamically, and automatically build queries for these unstructured database files, determine the relevancy of each unstructured database files based on these queries, and identify the most relevant unstructured database files is needed.

Accordingly, the present disclosure provides for the receipt of a plurality of pre-defined query templates associated with at least one alert type; a dynamically filtering of the plurality of pre-defined query templates based on the at least one alert type; and the identification of at least one unstructured database note based on a user identifier. Further, the disclosure provides for an application of the at least one unstructured database note and the filtered plurality of pre-defined query templates to an unstructured notes search engine; the generation, by the unstructured notes search engine, of at least one raw score for the at least one unstructured database note and for each of the at least one alert type; and the transformation, by the unstructured notes search engine, of the at least one raw score to a relevancy score using a quantile transformation; and determine a highest relevancy score for each of the at least one unstructured database note for the user identifier.

In other words, the disclosure provides a system for dynamically generating queries for determining whether the data associated with the queries are present in unstructured datasets. For instance, the system may act by retrieving pre-defined query templates which are fillable queries by the unstructured datasets that will be analyzed, whereby the filtering may occur based on the alert type identified at a first step. Once the query templates have been filtered, then the unstructured datasets may be used to generate raw scores for each combination of the unstructured datasets as compared to the pre-defined query template. Once the applicable queries are determined, the system may feed the generated queries and database notes (such as database notes from previous interactions between an entity and a user) into an upstream quantile score transformer which may be configured to determine empirical and distributed scores for each applicable pre-determined query and for each unstructured database note (such as from 0 to 1, with 1 for most applicable and most present). Upon generating the relevance score from the quantile transformation, the system may determine the highest relevancy score across both the unstructured database notes and the pre-determined query templates to determine what the overall relevancy score is for the alert type. In this manner, the system acts to determine whether the data of the alert type (which is shown in the pre-determined query templates) is present and above a pre-defined threshold within an unstructured dataset (which may be used to indicate that the alert may be closed, and the data has been identified within the database). With respect to a practical use, the system may be used to determine whether a communication comprising the data of the alert type has already been made between an entity and a user of the entity (e.g., the note is present which discloses the data of the pre-determined query which indicates a communication has occurred and the transcript of the communication is stored in the database) and the alert type may be automatically closed.

What is more, the present disclosure provides a technical solution to a technical problem. As described herein, the technical problem includes the determination of information and content within unstructured datasets automatically and efficiently. The technical solution presented herein allows for the automatic building of dynamic queries for identifying data in unstructured datasets. In particular, the system provided herein is an improvement over existing solutions to the identification of content and data in unstructured datasets and the filtering of such unstructured datasets which may not be relevant, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for automatically building dynamic queries for identifying data in unstructured datasets 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for automatically building dynamic queries for identifying data in unstructured datasets, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process flow 200.

As shown in block 202, the process flow 200 may include the step of receiving a plurality of pre-defined query templates associated with at least one alert type. For instance, and as used herein, the pre-defined query templates comprise a plurality of templates which are available for each alert type. In some embodiments, the plurality of pre-defined templates is similar to questions that may be asked based on the data associated with an alert type. For example, and where an alert type is an equity alert, then questions (e.g., pre-defined template queries associated with that alert type) may comprise: "what conversations have been had with the user regarding a stock A?;" "what conversations have been had with the user regarding stock B?;" "is there an explicit hold recommendation made by an entity associate (e.g., associated with a client of the system)?;" "have any recommendations been made to diversify the user's position?;" and/or the like. Thus, and for each alert type, a pre-defined set or query templates (or questions) may be generated and/or compiled, and analyzed by the system for dynamic filtering.

Thus, and as used herein, the alert type refers to a classification of questions which may be asked with respect to a database notes, such as the classification of pre-defined query templates. In some embodiments, the alert type may be generated by a client of the system, a user associated with a client of the system, a manager of the system, and/or the like. In this manner, the alert type may be used to indicate a particular type of information that is expected to be found in the database note(s) associated with a user identifier (user id), such as a particular statement that may have been made between an entity and a user of the user ID and captured in at least one database note (such as a statement or question directed to an equity type of an alert type, like the examples provided above).

In some embodiments, the at least one alert type comprises user characteristic data, user account data, historical occurrence data, or historical alert evaluation module contact data. For example, the alert type may comprise data regarding user characteristics of the user for the user ID, user account data associated with the user ID, historical occurrence data of particular occurrences of events and/or data exchanged between the user of the user ID and another entity, historical alert evaluation module contact data (e.g., such as historical data regarding users of an entity that have previously communicated with the user of the user ID for a particular alert type or particular pre-defined query template), and/or the like. In some embodiments, the unstructured database notes may comprise communications between a user and an entity such as email communications, transcribed phone calls, transcribed video calls, text messages, instant messages, and/or the like.

As shown in block 204, the process flow 200 may include the step of dynamically filtering the plurality of pre-defined query templates based on the at least one alert type. For instance, the system may dynamically filter the pre-defined query templates to take out, delete, and/or retract at least one of the pre-defined query templates for the alert type based on the non-applicability of the deleted pre-defined query template(s) to the alert type details. In this manner, the alert type details may comprise specific details regarding what is expected in the database notes, what is needed to complete the alert type (e.g., answer the question(s) of the alert type), and/or the like. Thus, the dynamic filtering of the pre-defined query template(s) may allow for more efficient computing resource consumption as only those pre-defined query templates that are applicable and necessary to carry out the purpose of the alert type are used for analyzing the database note(s), rather than every pre-defined query template possible which may overburden processors and storage components which are attempting to analyze the database note(s) and store the associated results for each pre-defined query template. Thus, and in some embodiments, the dynamic filtering of the at least one pre-defined query templates comprise automatically deleting non-applicable pre-defined query templates based on the at least one alert type.

As shown in block 206, the process flow 200 may include the step of identifying at least one unstructured database note based on a user identifier. For example, the system may identify at least one unstructured database note(s) from a plurality of unstructured database note(s) based on a user ID associated with the unstructured database note(s). For instance, each unstructured database note may be stored in a database (such as a database comprising records of all the communications between an entity(ies) and the entity's associated users) and each unstructured database note may be stored based on the user ID for each communication (e.g., the user ID that participated in the communications with the entity). In this manner, the unstructured database notes may each be stored with a user ID, and the database may be queried to access all the unstructured database notes associated with a particular user ID.

In some embodiments, the at least one unstructured database note is received from a database comprising a plurality of unstructured note datasets each comprising a plurality of unstructured database notes for each user identifier. In some such embodiments, the system may transmit a request to the database (in an instance where the database is remote from the system) to request all the database notes associated with the user ID, and then the system may receive all the unstructured database notes from the database associated with the user ID. Further, and in some embodiments, the system may transmit a plurality of requests to the database for a plurality of user IDs which each have their own alert type for a plurality of datasets comprising a plurality of unstructured database notes, whereby each dataset is associated with each user ID. In this manner, the system may complete each of these requests in parallel for a plurality of user IDs and a plurality of alert types, without undue delay for receiving and analyzing the database notes for each user ID.

In some embodiments, the at least one unstructured database note is associated with a creation timestamp. Further, and in some embodiments, the creation timestamp is compared to a timestamp threshold, and filter, in an instance where the creation timestamp meets or exceeds the timestamp threshold, out the at least one unstructured database note. For example, and in such embodiments, the system may generate a timestamp threshold and may only analyze the unstructured database notes that are within the timestamp threshold (e.g., not too old based on the timestamp threshold which may comprise a period of time from the current time, such as 180 days, 365 days, and/or the like, from the current time or date). In this manner, and based on the creation timestamp of the unstructured database note, whereby the creation timestamp may comprise a time since the creation of the unstructured database note (e.g., a time between the current time and the time at which the communication between the user of the user ID and the entity was created and recorded), the creation timestamp may be compared against the timestamp threshold. Further, and of the dataset of database notes, the database notes that are older than the timestamp threshold (e.g., have a creation timestamp that exceeds and/or meets the timestamp threshold), these database notes will be filtered out from the analysis described hereinbelow. In this manner, and in some embodiments, such automatic filtering may allow for more efficient computing resource consumption, less storage capacity used, and/or the like, while also allowing for more efficient computer processing in performing the analysis described hereinbelow. Further, and based on such automatic filtering of older database notes, the system may determine whether the alert type has been completed (e.g., the communications have covered the issues described within the alert type) in a recent communication, and thus whether the alert type may be closed (e.g., where the issue(s) of the alert type were handled and/or discussed with the user) or advanced (e.g., for further communications between the entity and the user to discuss the issue(s) of the alert type).

As shown in block 208, the process flow 200 may include the step of applying the at least one unstructured database note and the filtered plurality of pre-defined query templates to an unstructured notes search engine (UNSE). For example, the system may apply the at least one unstructured database note and the filtered set of pre-defined query templates to an unstructured notes search engine (UNSE) which is configured to analyze the unstructured database notes against the filtered pre-defined query templates and determine relevancy scores for each database note as compared to each filtered pre-defined query template. Such relevancy scores may first comprise a raw score which indicates the relevancy of the database note to each pre-defined query template (e.g., the higher the raw score, the greater the relevancy of the database note to the pre-defined query template/question).

As shown in block 210, the process flow 200 may include the step of generating, by the unstructured notes search engine, at least one raw score for the at least one unstructured database note and for each of the at least one alert type. For example, and as used herein, the UNSE may generate the raw score for each unstructured database note based on analyzing the data of each unstructured database note for particular terms, words, phrases, alphanumeric characters, and/or the like, which are based on the filtered pre-defined query templates. In some embodiments, the system may use a natural language processor and/or machine learning model to analyze these unstructured database notes for these particular terms, phrases, characters, and/or the like. In some embodiments, and the greater the presence of these terms, phrases, characters, and/or the like, within the database note, the greater the raw score generated by the system.

As shown in block 212, the process flow 200 may include the step of transforming, by the unstructured notes search engine, the at least one raw score to a relevancy score using a quantile transformation. Further, and upon generating the raw score, the system may then apply a quantile transformation to the raw score to generate comparable relevance scores for each of the database notes and pre-defined query template (e.g., which may transform the raw score to a relevancy score between 0 and 1). Such a transformation is shown and described below in further detail with respect to FIG. 5. Additionally, and upon generating the relevancy scores for each database note, a comparison of the relevancy scores may occur and each database note and its highest relevancy score may be identified and chosen as the relevancy score for each database note for the alert type. Such exemplary diagrams showing this quantile transformation and associated raw scores and relevancy scores are shown and described further hereinbelow with respect to FIG. 5.

As shown in block 214, the process flow 200 may include the step of determining a highest relevancy score for each of the at least one unstructured database note for the user identifier. For example, the system may use the highest relevancy score for all the database notes and for all the filtered pre-defined query templates as the chosen relevancy score for the alert type, which may indicate whether the alert type has been handled (e.g., the communication between the user and the entity recorded in the database note(s) has been discussed and handled) or whether the alert type/user ID should be advanced for further communication(s) to handle the alert type by the entity.

Additionally, and in some embodiments, the highest relevancy score may be compared against a relevancy score threshold, which may be used by the system to automatically determine whether the alert type has been handled (when the highest relevancy score meets or exceeds the relevancy score threshold) or whether the alert type has not been handled (when the highest relevancy score does not meet the relevancy score threshold). In some embodiments, a lower relevancy score threshold may be used by the system to determine whether to escalate the alert type for further analyzation and/or generate further communications to the user to resolve the alert type.

FIG. 3 illustrates a process flow 300 for closing or advancing a user identifier associated with a relevancy score based on a comparison of the highest relevancy score to a relevancy score threshold, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process flow 300.

In some embodiments, and as shown in bock 302, the process flow 300 may include the step of determining a relevancy score threshold. For example, and in some embodiments, the system may determine a relevancy score threshold based on past or historical relevancy scores for alert types that were closed (e.g., the alert type was handled or addressed in at least one database note), and/or based on receiving the relevancy score threshold from a user device associated with the system. For example, and in some embodiments, the system may receive the relevancy score threshold from a client of the system, from a manager of the system, a user of the client of the system, and/or the like. In some embodiments, the relevancy score threshold may be used by the system to automatically determine whether the alert type may be closed for the user ID or whether the alert type was not handled, and the user ID should be advanced for further analysis and communications with the user.

As used herein, the relevancy score threshold may comprise a comparable value to the highest relevancy score that was quantile transformed in the steps described hereinabove with respect to FIG. 2. Thus, the relevancy score threshold may comprise the same unit value as the highest relevancy score (e.g., a percentage, a decimal value between 0 and 1, and/or the like).

In some embodiments, and as shown in block 304, the process flow 300 may include the step of comparing the relevancy score threshold to the highest relevancy score for the user identifier. For example, and in some embodiments, the system may compare the relevancy score threshold to the highest relevancy score for the alert type which was determined in block 214 of FIG. 2. As used herein, the term "compare" refers to the determination of similarities or differences between two numerical values (such as the highest relevancy score and the relevancy score threshold).

In some embodiments, and as shown in block 306, the process flow 300 may include the step of determining whether to close the at least one alert type associated with the user identifier based on the relevancy score threshold compared to the highest relevancy score. For example, and in some such embodiments, the system may determine whether to close the alert type if the highest relevancy score meets or exceeds the relevancy score threshold. In contrast and where the highest relevancy score does not meet or exceed the relevancy score threshold, then the system may automatically execute a transmission of the user ID and/or the alert type to a secondary alert system (such as an alert evaluation module) for further processing.

In some embodiments, and as shown in block 308, the process flow 300 may include the step of closing, in an instance where the highest relevancy score meets or exceeds the relevancy score threshold, the at least one alert type associated with the user identifier. For example, and in some such embodiments, the system may automatically close the alert type for the user ID once the determination that the alert type has been handled or the issue associated with the alert the has been resolved based on the prior communications recorded in the unstructured database notes. In some such embodiments, the relevancy score threshold may comprise a high percentage, such as but not limited to 90% or 0.9.

In some embodiments, and as shown in block 310, the process flow 300 may include the step of advancing, in an instance where the highest relevancy score does not meet the relevancy score threshold, the user identifier to an alert evaluation module. For example, and in some such embodiments, the system may advance the alert type and/or the user ID to a secondary system, such as an alert evaluation module which is configured to generate an alert to an entity (such as the entity associated with the alert type) that further communications to the user may need to be generated and transmitted to a user device associated with the user before the alert type can be closed.

In some such embodiments, and upon determining that the alert type and/or the user ID needs to be advanced to the alert evaluation module, the system and processes described herein may occur at a later time to confirm whether the alert type has been resolved by later communications with the user. In some such embodiments, the processes described herein may occur at predetermined intervals until the alert type can be closed (e.g., the alert type issue is resolved), and such predetermined intervals may comprise a weekly interval, a monthly interval, and/or the like. In this manner, the processes described herein may automatically be triggered without human intervention to regularly and continuously advance or close the alert types based on newly received unstructured database notes. Such automatic and continuous processes may lower network communications by allowing for the processes to occur without manual triggers or interventions being transmitted between user devices, over a network, and to the system described herein.

FIG. 4 illustrates a table diagrams 400 generating and filtering pre-defined query templates, in accordance with an embodiment of the disclosure. In some embodiments, a system (e.g., similar to one or more of the systems described herein with respect to FIGS. 1A-1C) may perform one or more of the steps for generating table diagrams 400. For example, a system (e.g., the system 130 described herein with respect to FIG. 1A-1C) may perform the steps for generating table diagrams 400.

As shown in table diagram 400, an alert type may be identified and associated with a user ID (shown as client ID) in table 410. From this data of the alert type and the user ID in table 410, the system may generate a list of pre-defined query templates (shown as table 420) which may be filtered to generate a list of applicable pre-defined query templates by deleting and/or filtering out the non-applicable pre-defined query templates (shown as table 430). Such a dynamic filtering may occur by applying the information of the alert type details (shown in table 440). As understood by a person of skill in the art at the time of this disclosure, the tables provided herein to show the dynamic filtering of pre-defined query templates are shown for exemplary purposes only and are not intended to limit the disclosure to any particular field, alert type, or endeavor.

FIGS. 5 and 6 illustrates a table diagrams 500 generating relevancy scores for the pre-defined query templates, determining a highest relevancy score and exemplary tables and graphs 600 for a quantile transformation, in accordance with an embodiment of the disclosure. In some embodiments, a system (e.g., similar to one or more of the systems described herein with respect to FIGS. 1A-1C) may perform one or more of the steps for generating table diagrams 500 and tables and graphs 600. For example, a system (e.g., the system 130 described herein with respect to FIG. 1A-1C) may perform the steps for generating table diagrams 500 and tables and graphs 600.

As shown in table diagram 500, the system may determine and collect the filtered pre-determined query templates (queries 502), collect the unstructured database notes (database notes 503) based on the user ID 504 and input the queries 502 and database notes 503 to an unstructured notes search engine (UNSE 505) which is configured to determine a raw score for each unstructured database note and pre-determined query template. For example, and as shown in table 506, a raw score may be generated across each unstructured database note (shown as S1, S2, S3,) and each filtered pre-determined query template (shown as Q1, Q2, Q3, Q4, Q5), whereby the raw score generated may comprise a numerical value such as −72.38 for S1,Q1; −81.27 for S2,Q1; −82.86 for S3,Q1; and/or the like. Upon generating each of these raw scores, a quantile transformation may be applied to each raw score to create a comparable score for each raw score as a relevance score (such as a score between 0 and 1).

In order to carry out this quantile transformation, the system will carry out an empirical cumulative distribution function on a validation set of pre-determined query templates and a set of unstructured database notes, which will then be used to map the original or raw values generated to values between 0 and 1. In this manner, the system can uniformly distribute the raw values to generate uniformly distributed values between 0 and 1 (such as 0, 0.1, 0.2, 0.3, 0.4, 0.5, 0.6, 0.7, 0.8, 0.9, and 1.0). In the first step of this process, the system may compute a score for each validation unstructured database note as compared to a validation pre-determined query template to generate a raw score, where a raw score is generated for the entire validation set (such as for 10 unstructured database notes for the same pre-determined query template).

Once the raw scores for all unstructured database notes of the validation set have been generated for the same pre-determined query template (e.g., question), the raw scores may be generated as a cumulative distribution function to determine which values will be used for which points of the cumulative distribution points. For example, the system will use a quantile transformation (e.g., the proportion of the data whose values are less than the raw score at issue) to generate the relevance scores for each validation unstructured database note. For instance, and as shown in table 610 of FIG. 6, the flan_scores (also referred to as the raw score for each unstructured database note) may be used to determine the ranking of each unstructured database note. As shown in table 610, the raw score for the first unstructured database note is −49.409 (which is greater than the rest of the raw scores for the other 9 unstructured database notes), so the quantile transformation may comprise F (X)=9/(9+0)=1 (which is shown in the right-most column of table 610). Similarly, the second unstructured database note has a raw score that is greater than 8 other raw scores for the 8 other unstructured database notes and smaller than 1 other note (the first unstructured database note), which leads the quantile transformation to be F(X)=8/(8+1)=8/9 or 0.888889. Thus, each of the validation unstructured database notes and their associated raw scores are applied to the quantile transformation and a cumulative distribution function is generated.

Next, and upon generating the cumulative distribution function with the validation set, the system may generate a graph (such as graph 620) which shows an interpolation function between the data points of the cumulative distribution function and the fitted curve between each data point. This graph, which has been specifically and uniquely generated for each pre-determined query template based on its own validation set of unstructured database notes, may be used for determining the relevancy score for each new unstructured database note received and/or identified based on its raw score. For instance, any raw scores generated after the interpolation function of the cumulative distribution function may be fit into the interpolation function to determine where the new raw score fits in the fitted curve and which relevancy score is most similar to the data point on the fitted curve.

Thus, and as shown in table 507 of FIG. 5, each of the raw scores for each of the unstructured database notes and pre-determined query templates may be transformed to a relevance score which is cumulatively distributed between 0 and 1. From the table of 507, and the relevancy scores generated, the system may continue by determining a highest relevancy score for each unstructured database note across all the pre-determined query templates (e.g., 0.9 was the highest for S1 for all Q1, Q2, Q3, Q4, and Q5; and 0.2 was the highest for S2 across each Q1, Q2, Q3, Q4, and Q5; and 0.8 was the highest for S3 for each Q1, Q2, Q3, Q4, and Q5). Upon determining the highest relevancy score across all the pre-determined query templates for each unstructured database note, the system may then determine the highest relevancy score across all the unstructured database notes (here 0.9 as shown in table 509). Thus, the highest relevancy score determined for the alert type and the user ID will be 0.9.

Lastly, and in some embodiments, the system may compare the highest relevancy score against a relevancy score threshold to determine whether to close the alert type or advance the user ID and/or the alert type to a secondary system. As shown in cell 512, the system may determine that the highest relevancy score was 97.8% exceeds a pre-determined relevancy threshold (such as 90%), and that the likelihood of closing the alert type is 86.1% (shown in cell 511) which itself may be compared to an automatic closure threshold (such as 85%). In some embodiments, the automatic closure threshold may be used a secondary or backup threshold before an automatic closure is triggered, and may be generated or pre-determined by the system itself (such as based on historical closure thresholds), by a client of the system, by a user of a client of the system, and/or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automatically building dynamic queries for identifying data in unstructured datasets, the system comprising:
   a processing device;
   a non-transitory storage device containing instructions when executed by the processing device, causes the processing device to perform the steps of:
      receive a plurality of pre-defined query templates associated with at least one alert type;
      dynamically filter the plurality of pre-defined query templates based on the at least one alert type;
      identify at least one unstructured database note based on a user identifier;
      apply the at least one unstructured database note and the filtered plurality of pre-defined query templates to an unstructured notes search engine;
      generate, by the unstructured notes search engine, at least one raw score for the at least one unstructured database note and for each of the at least one alert type;
      transform, by the unstructured notes search engine, the at least one raw score to a relevancy score using a quantile transformation; and determine a highest relevancy score for each of the at least one unstructured database note for the user identifier.

2. The system of claim 1, wherein the non-transitory storage device containing instructions when executed by the processing device, causes the processing device to perform the steps of:
   determine a relevancy score threshold; and
   compare the relevancy score threshold to the highest relevancy score for the user identifier.

3. The system of claim 2, wherein the non-transitory storage device containing instructions when executed by the processing device, causes the processing device to perform the steps of:
   determine whether to close the at least one alert type associated with the user identifier based on the relevancy score threshold compared with the highest relevancy score,
      close, in an instance where the highest relevancy score meets or exceeds the relevancy score threshold, the at least one alert type associated with the user identifier, or
      advance, in an instance where the highest relevancy score does not meet the relevancy score threshold, the user identifier to an alert evaluation module.

4. The system of claim 1, wherein the at least one unstructured database note is associated with a creation timestamp.

5. The system of claim 4, wherein the creation timestamp is compared to a timestamp threshold, and filter, in an instance where the creation timestamp meets or exceeds the timestamp threshold, out the at least one unstructured database note.

6. The system of claim 1, wherein the at least one unstructured database note is received from a database comprising a plurality of unstructured note datasets each comprising a plurality of unstructured database notes for each user identifier.

7. The system of claim 1, wherein the at least one alert type comprises user characteristic data, user account data, historical occurrence data, or historical alert evaluation module contact data.

8. The system of claim 1, wherein the dynamic filtering of the at least one pre-defined query templates comprise automatically deleting non-applicable pre-defined query templates based on the at least one alert type.

9. A computer program product for automatically building dynamic queries for identifying data in unstructured datasets, the computer program product comprising a non-transitory computer-readable medium comprising code causing an apparatus to:
   receive a plurality of pre-defined query templates associated with at least one alert type;
   dynamically filter the plurality of pre-defined query templates based on the at least one alert type;
   identify at least one unstructured database note based on a user identifier;
   apply the at least one unstructured database note and the filtered plurality of pre-defined query templates to an unstructured notes search engine;
   generate, by the unstructured notes search engine, at least one raw score for the at least one unstructured database note and for each of the at least one alert type;
   transform, by the unstructured notes search engine, the at least one raw score to a relevancy score using a quantile transformation; and
   determine a highest relevancy score for each of the at least one unstructured database note for the user identifier.

10. The computer program product of claim 9, the computer program product further comprising non-transitory computer-readable medium comprising code causing an apparatus to:
    determine a relevancy score threshold; and
    compare the relevancy score threshold to the highest relevancy score for the user identifier.

11. The computer program product of claim 10, the computer program product further comprising non-transitory computer-readable medium comprising code causing an apparatus to:
    determine whether to close the at least alert type associated with the user identifier based on the relevancy score threshold compared with the highest relevancy score,
       close, in an instance where the highest relevancy score meets or exceeds the relevancy score threshold, the at least one alert type associated with the user identifier, or
       advance, in an instance where the highest relevancy score does not meet the relevancy score threshold, the client identifier to an alert evaluation module.

12. The computer program product of claim 9, wherein the at least one unstructured database note is associated with a creation timestamp.

13. The computer program product of claim 12, wherein the creation timestamp is compared to a timestamp threshold, and filter, in an instance where the creation timestamp meets or exceeds the timestamp threshold, out the at least one unstructured database note.

14. The computer program product of claim 9, wherein the at least one unstructured database note is received from a database comprising a plurality of unstructured note datasets each comprising a plurality of unstructured database notes for each user identifier.

15. A computer implemented method for automatically building dynamic queries for identifying data in unstructured datasets, the computer implemented method comprising:
    receiving a plurality of pre-defined query templates associated with at least one alert type;
    dynamically filtering the plurality of pre-defined query templates based on the at least one alert type;
    identifying at least one unstructured database note based on a user identifier;
    applying the at least one unstructured database note and the filtered plurality of pre-defined query templates to an unstructured notes search engine;
    generating, by the unstructured notes search engine, at least one raw score for the at least one unstructured database note and for each of the at least one alert type;
    transforming, by the unstructured notes search engine, the at least one raw score to a relevancy score using a quantile transformation; and
    determining a highest relevancy score for each of the at least one unstructured database note for the user identifier.

16. The computer implemented method of claim 15, further comprising:
    determining a relevancy score threshold; and
    comparing the relevancy score threshold to the highest relevancy score for the user identifier.

17. The computer implemented method of claim 16, further comprising:

determining whether to close the at least one alert type associated with the user identifier based on the relevancy score threshold compared with the highest relevancy score, closing, in an instance where the highest relevancy score meets or exceeds the relevancy score threshold, the at least one alert type associated with the user identifier, or advancing, in an instance where the highest relevancy score does not meet the relevancy score threshold, the client identifier to an alert evaluation module.

18. The computer implemented method of claim 15, wherein the at least one unstructured database note is associated with a creation timestamp.

19. The computer implemented method of claim 18, wherein the creation timestamp is compared to a timestamp threshold, and filter, in an instance where the creation timestamp meets or exceeds the timestamp threshold, out the at least one unstructured database note.

20. The computer implemented method of claim 15, wherein the at least one unstructured database note is received from a database comprising a plurality of unstructured note datasets each comprising a plurality of unstructured database notes for each user identifier.

* * * * *